(12) United States Patent
Jiang

(10) Patent No.: US 7,830,600 B2
(45) Date of Patent: Nov. 9, 2010

(54) ELECTRIC ROLL-UP LIMIT DETECTION DEVICE

(75) Inventor: Guoliang Jiang, Zhangjiagang (CN)

(73) Assignee: Sachii Fergameri Overseas Inc., Tortola (VG)

( * ) Notice: Subject to any disclaimer, the term of this patent is extended or adjusted under 35 U.S.C. 154(b) by 422 days.

(21) Appl. No.: 12/038,772

(22) Filed: Feb. 27, 2008

(65) Prior Publication Data
US 2008/0259451 A1 Oct. 23, 2008

(30) Foreign Application Priority Data
Apr. 18, 2007 (CN) .......................... 2007 1 0021507

(51) Int. Cl.
*G03B 21/56* (2006.01)
(52) U.S. Cl. ...................................... 359/461; 160/310
(58) Field of Classification Search ................. 359/461; 160/188, 310
See application file for complete search history.

(56) References Cited
U.S. PATENT DOCUMENTS

| 4,159,162 A * | 6/1979 | Christoffel ................... 359/461 |
| 4,372,367 A * | 2/1983 | Baldanello et al. ........... 160/310 |
| 4,615,371 A * | 10/1986 | Clauss ........................ 160/22 |
| 6,215,265 B1 * | 4/2001 | Wolfer et al. ................ 318/434 |
| 6,628,029 B2 * | 9/2003 | Astegno ...................... 310/105 |

\* cited by examiner

*Primary Examiner*—Christopher Mahoney
(74) *Attorney, Agent, or Firm*—Patent Law Group LLP; David C. Hsia

(57) ABSTRACT

An electric roll-up limit device includes a tube coupled by a tube rotor to an electric motor. The tube rotor contains a rocker bar that extends from the tube and activates a lower limit switch when a sheet of material is fully unrolled from the tube. A base below the tube rotor contains a pull bar cavity and an actuator device with a rotatable support frame and a rotatable actuator lever. The support frame supports the actuator lever and prevents it from rotating in one direction to activate an upper limit switch. A spring couples the rotation of the support frame and the actuator lever. When the sheet is fully rolled onto the tube, the pull bar cap retracts into the pull bar cavity and butts against the support frame. This causes the support frame to release the actuator lever, which then rotates to activate the upper limit switch.

14 Claims, 6 Drawing Sheets

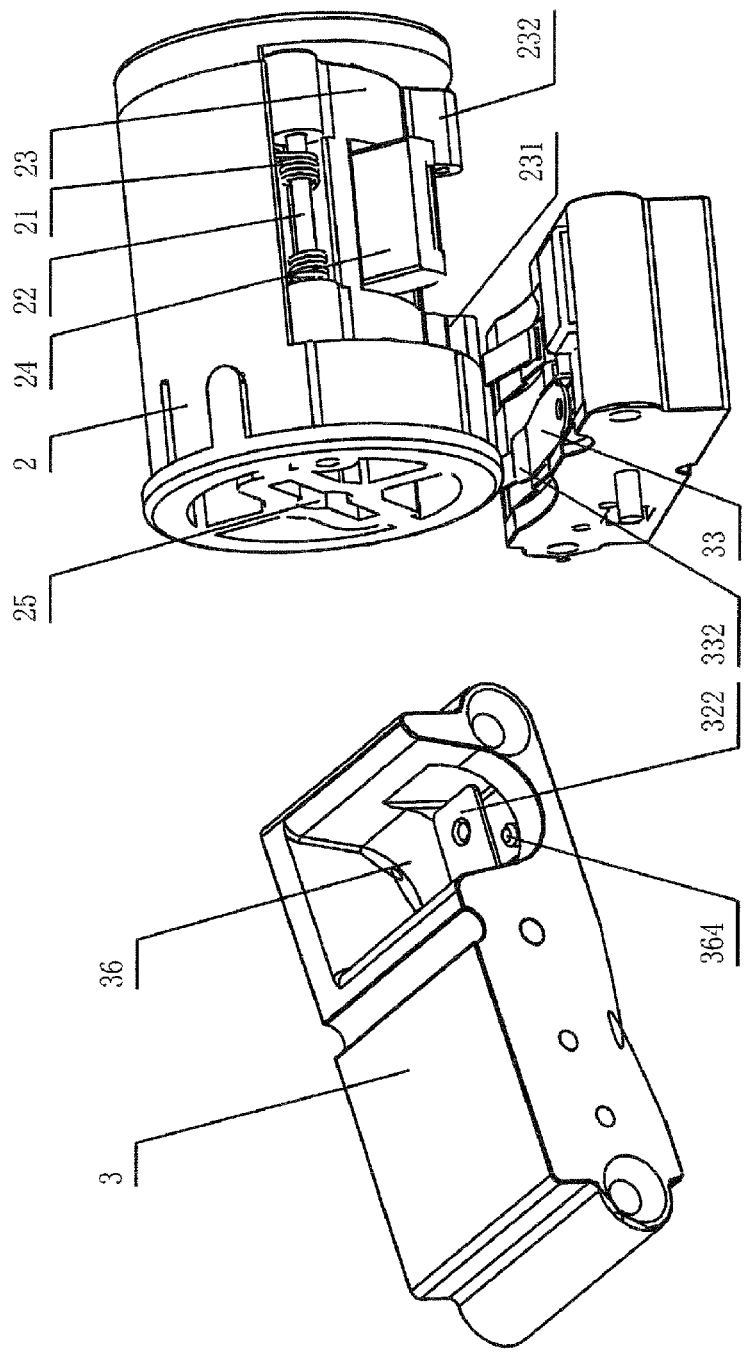

ELECTRIC ROLL-UP LIMIT DETECTION DEVICE

CROSS REFERENCE TO RELATED APPLICATION

This application claims the benefit of Chinese Application No. 200710021507.5 filed on Apr. 18, 2007 with the State Intellectual Property Office of the People's Republic of China, which is hereby incorporated by reference in its entirety.

FIELD OF INVENTION

The present invention relates to a limit detection device used to detect the position of rolled-up articles in electric roll-up screen devices.

DESCRIPTION OF RELATED ART

It is known that in the electric roll-up screen devices used for roll-up projection screens, window blinds, etc., all are configured with controllers and limit detection devices, and that the structures of the limit detection devices usually include: a screw mounted for connection on the output shaft of an electric motor, a traveling nut configured with threads on the screw, upper and lower limit switches placed separately at both sides of the screw, and the positions of the upper and lower limit switches able to be regulated, the electrical contacts of the upper and lower limit switches being connected via conducting wires to a controller that operates the electric motor. During production debugging, the relative positions of the upper and lower limit switches and the traveling nut are adjusted to cause the travel of the traveling nut between them to correspond to, respectively, the upward and downward travels of a projection screen, window blind, and other rolled-up articles. When working, under control of the controller, the electric motor drives the screw to rotate in a forward or reverse direction, causing the traveling nut to shift correspondingly in a straight line on the screw, and when the traveling nut bumps into the upper limit switch or the lower limit switch, the upper limit switch or the lower limit switch generates a detection signal that is sent to the controller, the controller shuts off the power source of the electric motor and causes the electric motor to stop rotating, making the rolled-up article stop in the required position. The disadvantage of such limit detection devices is that it is very easy for the positions of the upper and lower limit switches to be moved by vibrations during the shipping, moving, and other processes, resulting in the upper and lower limit positions of the projection screen, window blind, and other rolled-up article not matching and leading to inaccurate positioning; when severe it can also damage the electric window blind roll-up device.

SUMMARY

The technical problem that must be resolved by the present invention is: providing an electric roll-up limit detection device with accurate positioning that is safe and reliable.

To resolve the aforementioned technical problem, the technical program adopted by the present invention is: an electric roll-up limit detection device, comprising: a core tube, one end of the core tube being configured to move inside a support base, the other end of the core tube being mounted by configuration with a core tube rotor, the core tube rotor being affixed to the external rotating shaft of an electric motor, the electric motor being installed inside a motor housing; there is an assembly cavity configured inside the core tube rotor, a rocker bar configured to move inside the assembly cavity via a rocker bar pin and torsion spring, the tip end of the rocker bar protruding out from an opening in the core tube; there is also a positioning base mounted on the electric motor housing, there being upper and lower limit switches and an control cavity configured in the positioning base, the bottom side of the positioning base having a pull bar cavity in it that is interlinked with the control cavity, there being an actuator device in the control cavity for pressing the limit switches, an actuating piece in the actuator device extending into the pull bar cavity; the lower limit switch is located beneath the tip end of the rocker bar.

The specific structure of the above-described actuator device is: there is a support frame and an actuator lever configured to move inside the control cavity, the front end of the actuator lever being located above the upper limit switch, there being a compression spring configured between the rear end of the actuator lever and the support frame, the front end of the support frame standing upright vertically, forming the actuating head, the front end of the aforementioned actuator lever being supported on the actuating head, there being an actuating piece configured on the rear portion of the support frame, and there being a reset spring configured between the actuating piece and the pull bar cavity.

There is also a limit block configured in said assembly cavity, there being a limit through-hole opened in said rocker bar, the movement of the limit block protruding through the limit through-hole.

The aforementioned upper and lower limit switches are micro switches.

The beneficial result of the present invention is: in the present invention the upper and lower limit switches are mounted and installed separately in the positioning base and are triggered directly by the actual positions of the upper and lower limits of the projection screen, window blind, or other rolled-up article, overcoming the defect of the positions of prior upper and lower limit switches being prone to movement and inaccurate positioning, ensuring the correct positioning of the upper and lower limit positions of the rolled-up article; at the same time, the safe properties of the overall limit detection device can also provide reliable guarantees, greatly reducing maintenance costs.

BRIEF DESCRIPTION OF THE DRAWINGS

FIG. 7 is an illustration of the three-dimensional structure in a bottom view of FIG. 6;

FIG. 8 is an illustration of the positional relationship of the core tube rotor and the positioning base;

In FIG. 1 to FIG. 10: 1, core tube; 11, outer actuating head opening; 12, inner actuating head opening; 2, core tube rotor; 21, torsion spring; 22, rocker bar pin; 23, rocker bar; 24, limit block; 25, mounting opening; 3, positioning base; 31, control cavity; 32, support frame; 321, compression spring post; 322, actuating piece; 323, actuating head; 324, reset spring post; 325, support frame support stirrup; 33, actuator lever; 331, compression spring post; 332, actuator lever front end; 333, actuator lever rear end; 335, actuator lever support stirrup; 34, compression spring; 35, reset spring; 36, pull bar cavity; 364, reset spring post; 37, pin shaft; 4, upper limit switch; 5, lower limit switch; 6, electric motor housing; 71, left end cover; 72, support base; 73, bearing; 74, core tube plug; 75, auxiliary positioning base; 751, auxiliary pull bar cavity; 77, pull bar; 78, pull bar cap; 79, right end cover; 80, projection screen; 9, electric motor; 231, outer actuating head; 232, inner actuating head.

Use of the same reference numbers in different figures indicates similar or identical elements.

DETAILED DESCRIPTION OF THE INVENTION

A further description of the present invention in conjunction with the attached diagrams is given below.

Figure 1:
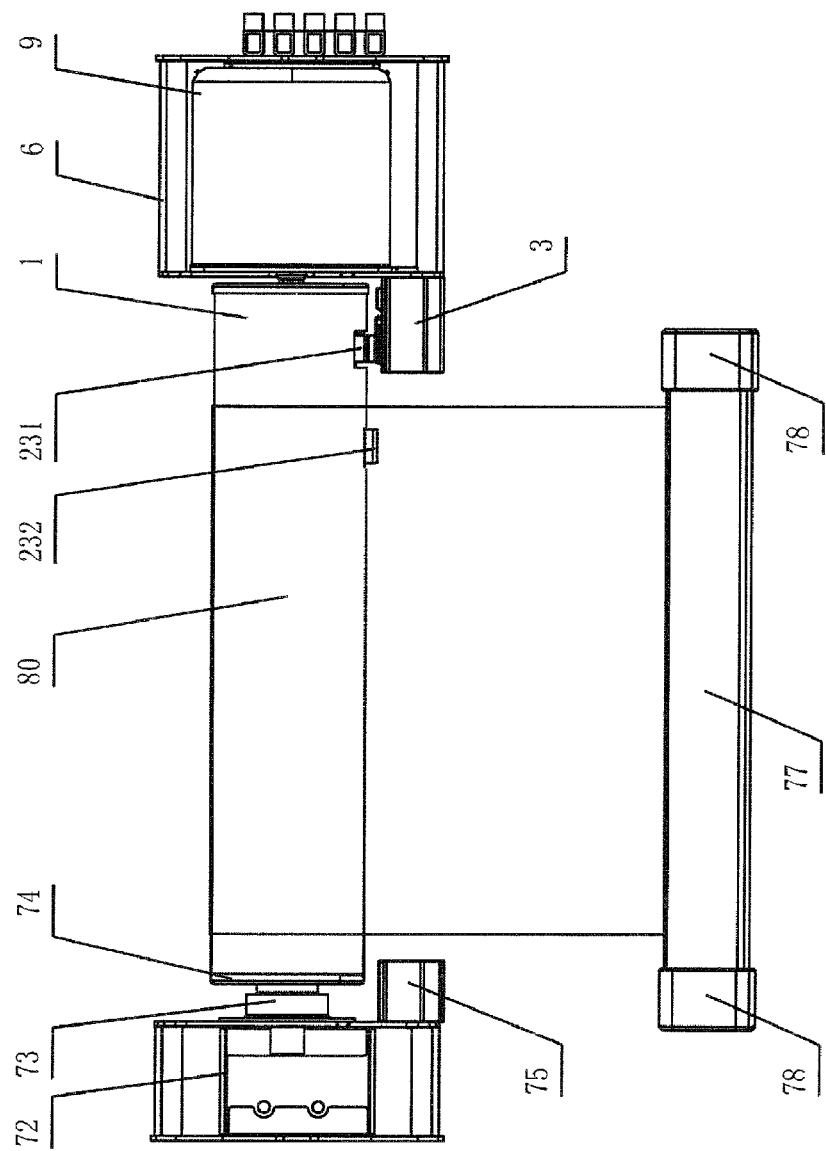
FIG. 1 is an illustration of a front view of the structure of the present invention.
Figure 2:
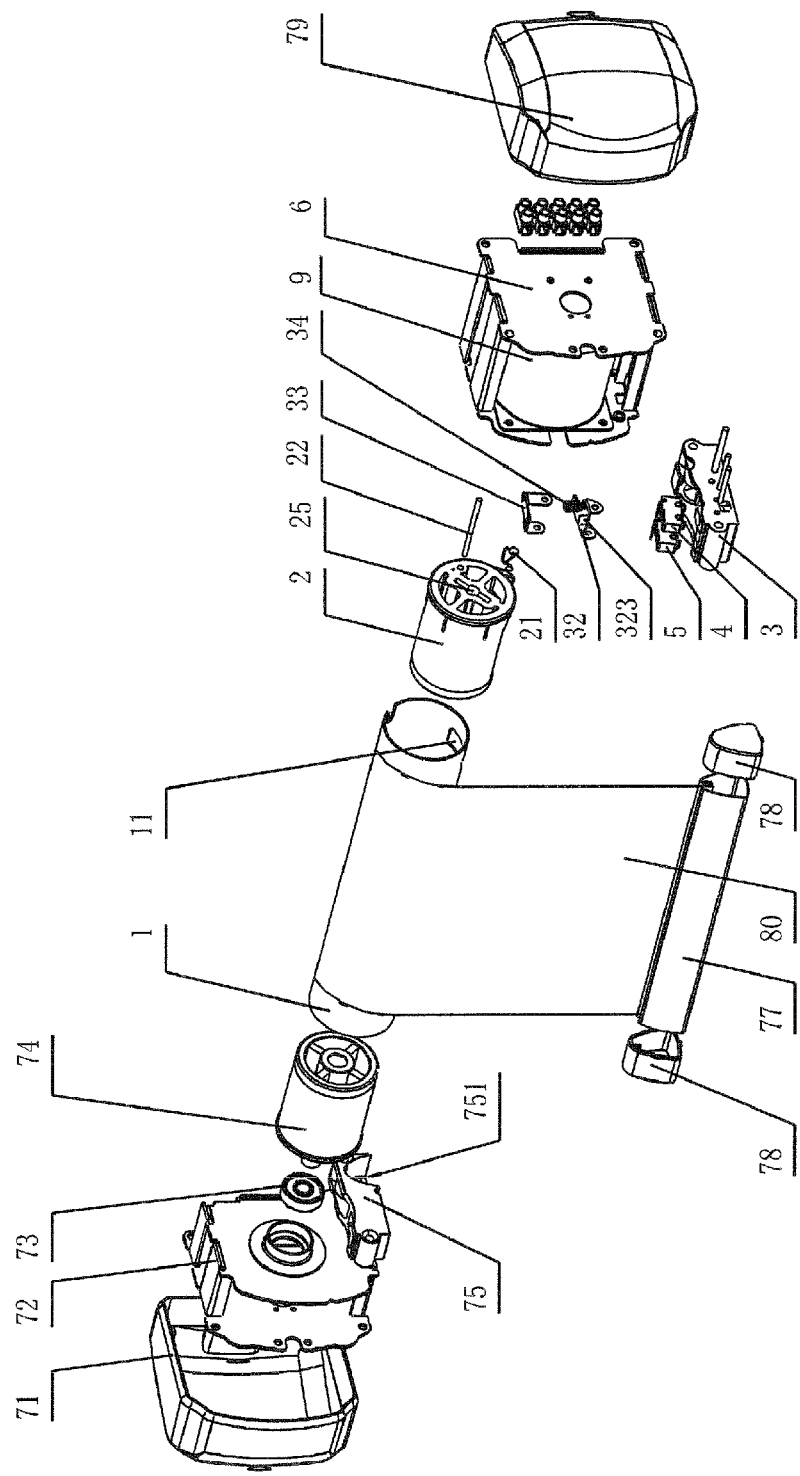
FIG. 2 is an illustration of an exploded view of the structure of the present invention.

FIGS. 1 and 2 illustrate an electric roll-up limit detection device in one embodiment of the present invention. The device includes a core tube 1 having two open ends. One end of core tube 1 is rotatably mounted to a support base 72 via a core tube plug 74 and bearing 73. The other end of core tube 1 has a fixed mount with a core tube rotor 2. Core tube rotor 2 is affixed via a mounting opening 25 to the external rotating shaft of an electric motor 9. Electric motor 9 is installed inside an electric motor housing 6.

Figure 4:
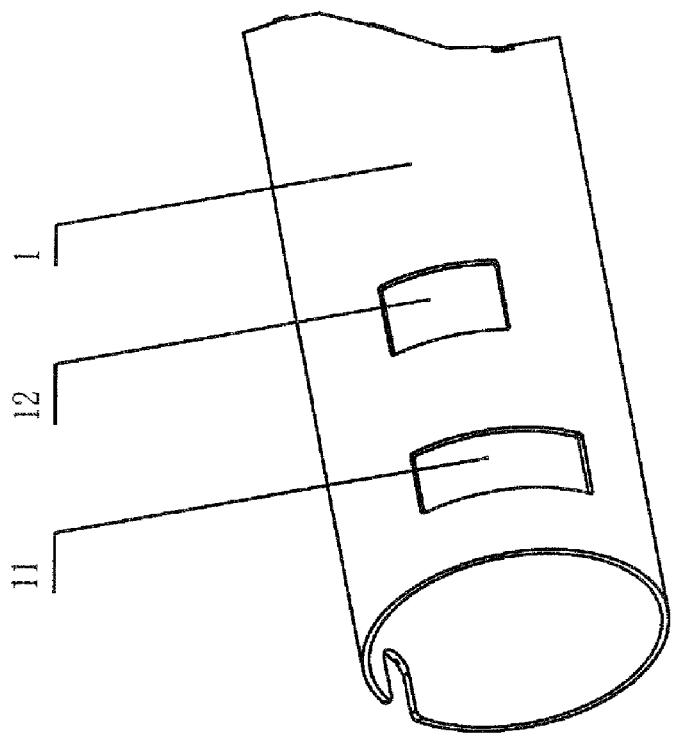
FIG. 4 is an illustration of the three-dimensional structure of the local structure of one end of the core tube.
Figure 3:
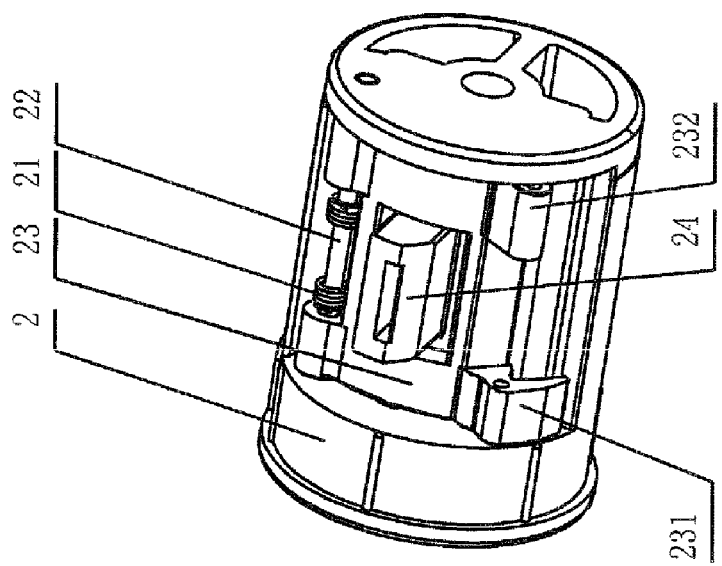
FIG. 3 is an illustration of the three-dimensional structure of the core tube rotor.
Figure 5:
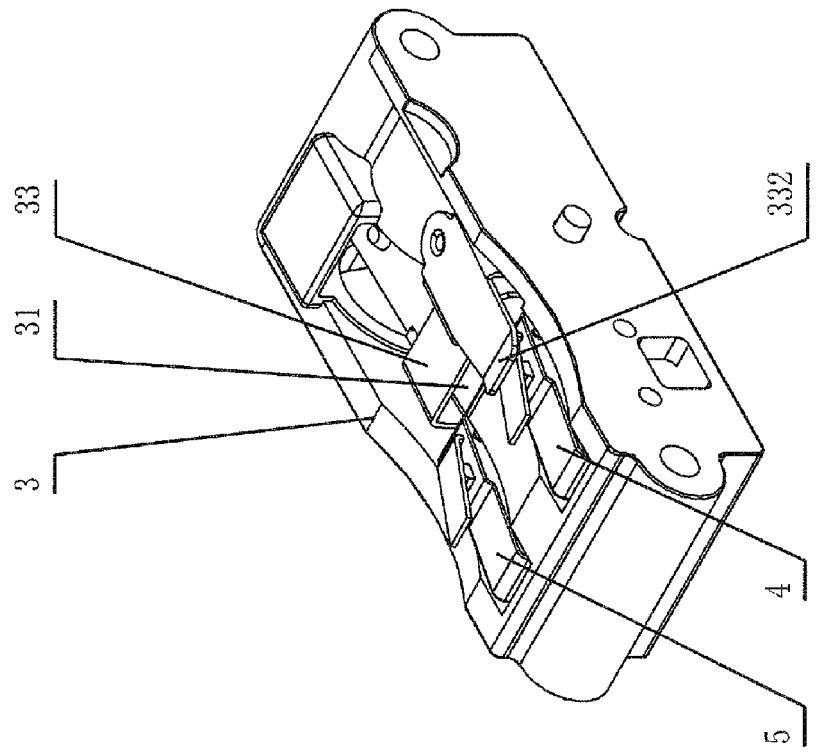
FIG. 5 is an illustration of the assembled relationship of the core tube rotor and the core tube.

As illustrated in FIG. 3, the interior of core tube rotor 2 is configured with an assembly cavity. A rocker bar 23 is configured to move inside the assembly cavity via a rocker bar pin 22 and a torsion spring 21. In one embodiment, the tip end of rocker bar 23 is configured with inner and outer actuating heads 232 and 231. Referring to their structure as illustrated in FIGS. 4 and 5, inner and outer actuating heads 232 and 231 protrude separately from inner and outer actuating head openings 12 and 11 on core tube 1.

Figure 6:
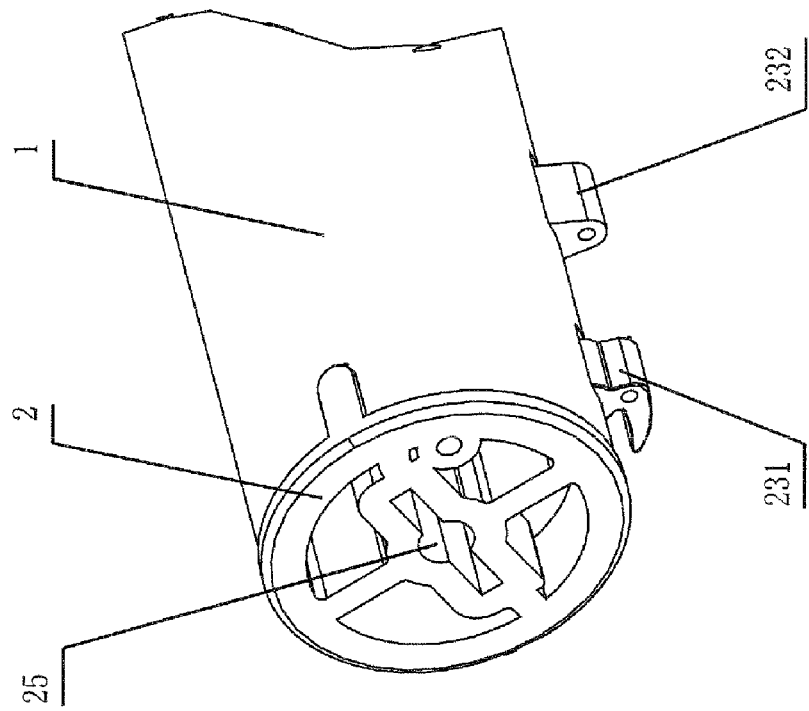
FIG. 6 is an illustration of the three-dimensional structure of the pressing device and the positioning base of the upper and lower limit switches.

As illustrated in FIGS. 6 and 7, there is a positioning base 3 mounted on electric motor housing 6. There are upper and lower limit switches 4 and 5 and a control cavity 31 configured on positioning base 3. There is a pull bar cavity 36 interlinked with control cavity 31 opened on the bottom side of positioning base 3 and a pressing device configured to move inside control cavity 31.

Figure 10:
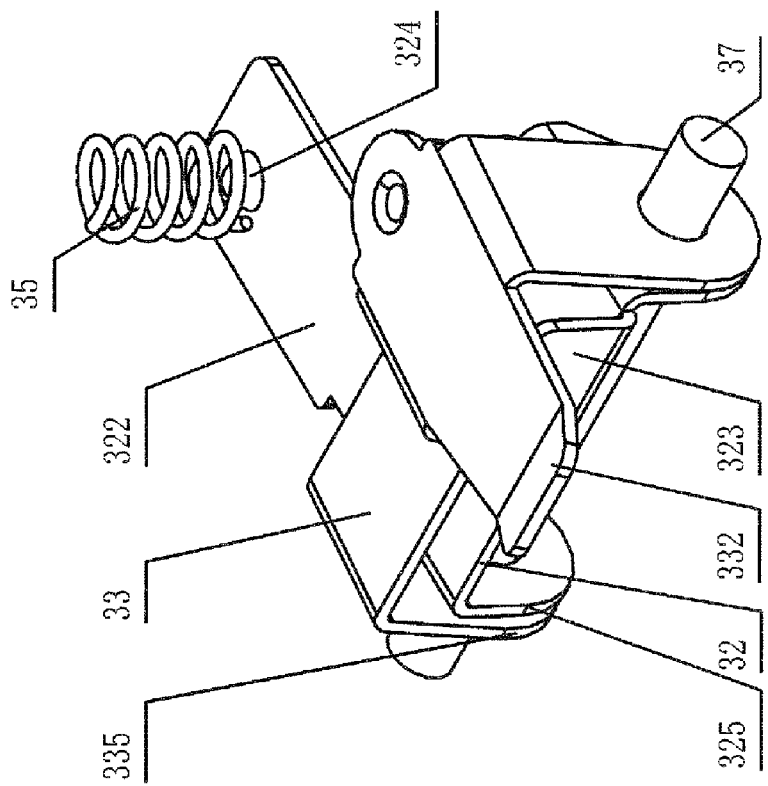
FIGS. 9 and FIG. 10 are, respectively, illustrations of the three-dimensional structure of the pressing device from two different viewing angles.
Figure 9:
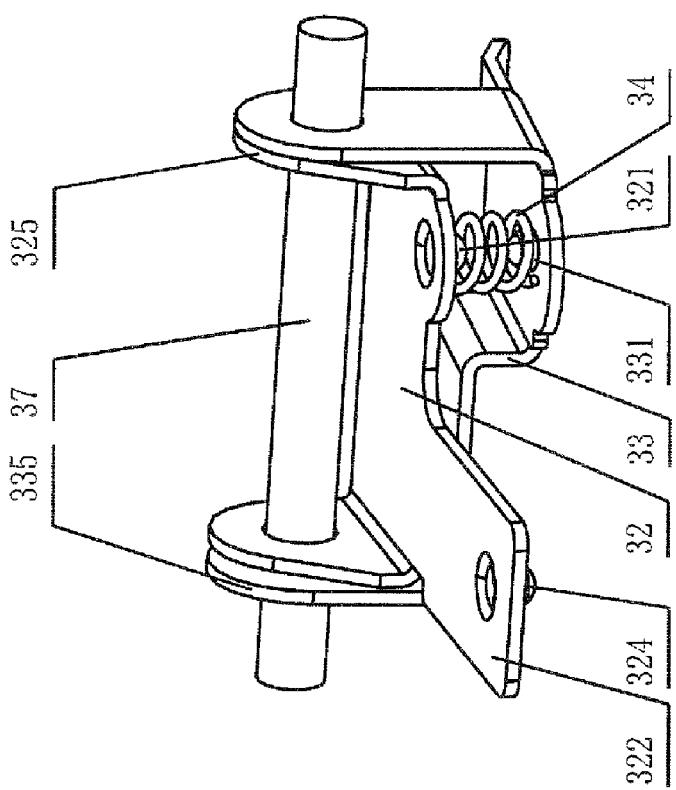

As illustrated in FIGS. 9 and 10, the specific structure of the pressing device includes a support frame 32 and actuator lever 33. The two sides of support frame 32 are separately configured with support frame support stirrups 325 and the two sides of actuator lever 33 are separately configured with actuator lever support stirrups 335. The pair of support frame support stirrups 325 and the pair of actuator lever support stirrups 335 rotatably receive a pin shaft 37 mounted inside control cavity 31.

An actuator lever front end 332 is located above upper limit switch 4. An actuator lever rear end 333 and support frame 32 are separately configured with matching compression spring posts 331 and 321. There is a compression spring 34 slipped onto this pair of compression spring posts 331 and 321. The front end of support frame 32 stands upright vertically, forming actuating head 323. Actuator lever front end 332 is supported on actuating head 323, causing actuator lever front end 332 and upper limit switch 4 to be in a separated state. An actuating piece 322 of the rear portion of support frame 32 extends into pull bar cavity 36. There are matching reset spring posts 324 and 364 configured on actuating piece 322. In pull bar cavity 36, there is a reset spring 35 slipped onto the pair of reset spring posts 324 and 364. Lower limit switch 5 is located beneath outer actuating head 231 at the tip end of rocker bar 23 as shown in FIG. 8.

In actual application, the electrical contacts of upper and lower limit switches 4 and 5 are connected via conducting wires to a controller that controls the operation of electric motor 9. As the conducting wires and the controller both are technologies commonly used in this field, they are not shown in the figures but without affecting the understanding and achieving this structure by technical personnel in this field.

As illustrated in FIG. 3, in one embodiment, to facilitate installation of core tube rotor 2, there is also a limit block 24 configured inside the assembly cavity. There is a limit through-hole opened in rocker bar 23. Limit block 24 moves to protrude into the limit through-hole, resulting in rocker bar 24 not being able to spread outward without limit. When limit block 24 butts against the outer side wall of the limit through-hole, rocker bar 23 spreads open to the extreme limiting position, thereby being able to effectively prevent rocker bar 23 from dropping off into the assembly cavity.

In one embodiment, upper and lower limit switches 4 and 5 have a pair of normally closed contact micro switches. During actual application, a projection screen 80, window blind, or other rolled-up article is rolled up on core tube 1. When projection screen 80, window blind, or other rolled-up article is in a rolled-up state, i.e., when it is not fully spread open, its right side edge will tightly wrap inner actuating head 232, causing rocker bar 23 to be forced into the assembly cavity, thereby placing outer actuating head 321 of the tip end of rocker bar 23 in a state of separation from lower limit switch 5.

In addition, there are also left and right end covers 71 and 79 configured separately on the two sides of core tube 1. There is a pull bar 77 configured on the bottom end of projection screen 80, window blind, or other rolled-up article. The two ends of pull bar 77 are separately configured with pull bar caps 78. To facilitate the homing of pull bar caps 78, there is also an auxiliary positioning base 75 matched with positioning base 3 configured on the support base 72. There is an auxiliary pull bar cavity 751 matched with pull bar cavity 36 in positioning base 3 opened in auxiliary positioning base 75.

For convenience in description, projection screen 80 is used here as an example for further demonstration. It is assumed electric motor 9 rotates forward and projection screen 80 rises up, and electric motor 9 rotates in reverse and projection screen 80 drops down. Next, the working principles of the present invention will be specifically described.

The aforementioned controller includes a forward direction power supply circuit that causes electric motor 9 to rotate forward, and a reverse direction power supply circuit that causes electric motor 9 to rotate in reverse. The pair of normally-closed contacts of upper limit switch 4 is connected in series via conducting wires into the forward direction power supply circuit, and lower limit switch 5 is connected in series via conducting wires into the reverse direction power supply circuit.

The working process of the present invention is as follows. When electric motor 9 is supplied with power for the forward direction, projection screen 80 continues to rise. When pull bar caps 78 at the two sides of the bottom of projection screen 80 separately enter auxiliary pull bar cavity 751 and pull bar cavity 36, pull bar cap 78 at the right side of projection screen 80 will press upward against actuating piece 322 in pull bar cavity 36, causing the entire support frame 32 to rotate around pin shaft 37. Actuator lever 33 supported by actuator lever front end 332 on actuating head 323 under the action of compression spring 34 also rotates together with support frame 32 around pin shaft 37 until actuator lever front end 332 presses on upper limit switch 4, breaking the normally closed contacts of upper limit switch 4. The controller then causes electric motor 9 to stop rotating because of the loss of power.

Further explanation is provided as follows. It can be seen from the process of the action of actuator lever 33 that the force of actuator lever front end 332 acting on upper limit switch 4 is only associated with the spring force of compression spring 34 and unrelated to the travel of actuating piece 322. Therefore, the selection of a compression spring 34 with the proper stiffness can provide very good protection for upper limit switch 4, which can thereby prolong the useful lifespan of upper limit switch 4. When electric motor 9 is supplied with power for reverse rotation, projection screen 80 continually drops downward. When projection screen 80 is completely opened up, because inner actuating head 232 of rocker bar 23 is released from the restraint of projection screen 80, the entire rocker bar 23 on torsion spring 21 spreads open outward. This causes outer actuating head 231 of the tip end of rocker bar 23 to press against lower limit switch 5, breaking the normally-closed contacts of the lower limit switch 5, and the controller causes electric motor 9 to stop rotating because of the loss of power.

It can be seen from the above-described working principles that the positions of installation for mounting upper and lower switches 4 and 5 of the present invention correspond to the actual upper and lower limit positions of projection screen 80, overcoming the defects of prior upper and lower limit switches of inaccurate positioning because the positions are prone to experiencing shifting. This ensures correct positioning of the upper and lower limit positions of projection screen 80, window blind, or other rolled-up article. At the same time, reliability guarantees can be provided for the safe properties of the entire limit detection device, greatly reducing maintenance costs.

Various other adaptations and combinations of features of the embodiments disclosed are within the scope of the invention. Numerous embodiments are encompassed by the following claims.

The invention claimed is:

1. An electric roll-up limit detection device, comprising:
 a core tube;
 an electric motor in an electric motor housing;
 a core tube rotor inserted into one end of the core tube, the core tube rotor being fixed to a shaft of the electric motor for rotating the core tube, the core tube rotor defining an assembly cavity, the core tube rotor comprising:
  a spring-loaded rocker bar pivotally mounted to a rocker pin and a torsion spring in the assembly cavity so a tip of the rocker bar is biased to pivot and protrude outward through an opening in the core tube; and
 a positioning base mounted to the electric motor housing, the positioning base defining a control cavity and a pull bar cavity interlinked to the control cavity, the positioning base comprising:
  an upper limit switch in the control cavity;
  an actuator device for actuating the upper limit switch, the actuator device comprising an actuating piece that extends into the pull bar cavity; and
  a lower limit switch in the control cavity and below the tip of the rocker bar.

2. The device of claim 1, wherein the actuator device comprises:
 a support frame rotatably mounted to a pin in the control cavity, the support frame comprising:
  a vertical front end that forms an actuator head;
  a rear end that forms the actuating piece;
 an actuator lever rotatably mounted to the pin in the control cavity, the actuator lever comprising:
  a front end located above the upper limit switch and supported by the actuator head of the support frame;
 a compression spring placed between a rear end of the actuator lever and the support frame;
 a reset spring placed between the actuating piece of the support frame and the pull bar cavity.

3. The device of claim 2, wherein the core tube rotor further comprises a limit block extending from the assembly cavity, wherein the rocker bar defines a limit block hole through which the limit block protrudes to limit how far the rocker bar can pivot outward.

4. The device of claim 2, wherein the upper and the lower limit switches are micro switches.

5. The device of claim 1, wherein the core tube rotor further comprises a limit block extending from the assembly cavity, wherein the rocker bar defines a limit block hole through which the limit block protrudes to limit how far the rocker bar can pivot outward.

6. The device of claim 1, wherein the upper and the lower limit switches are micro switches.

7. The device of claim 1, further comprising a sheet of material having one end attached to the core tube and another end attached to a pull bar with a pull bar cap, wherein:
 the rocker bar further comprises another tip biased to pivot and protrude through another opening in the core tube;
 the sheet presses against said another tip and prevents said another tip and the tip from protruding through said another opening and the opening when the sheet is rolled up on the core tube; and
 the sheet releases said another tip and allows said another tip and the tip to protrude through said another opening and the opening when the sheet is at least substantially unrolled from the core tube.

8. The device of claim 7, wherein the sheet is selected from the group consisting of a screen and a window blind.

9. An electric roll-up limit detection device, comprising:
 a core tube;
 a sheet of material having one end attached to the core tube to be rolled and unrolled from the core tube;
 a pull bar attached to another end of the sheet, the pull bar comprising a pull bar cap;
 a positioning base defining a control cavity and a pull bar cap cavity having a passage to the control cavity;
 an upper limit switch seated in the control cavity;
 an actuator device seated in the control cavity, the actuator device comprising:
  an actuator lever rotatably mounted in the control cavity, the actuator lever comprising:
   an actuator lever front end above the upper limit switch; and
   an actuator lever rear end;
  a support frame rotatably mounted in the control cavity, the support frame comprising:
   a vertical support frame front end that supports a bottom surface of the actuator lever front end; and
   a support frame rear end that forms an actuator piece extending from the control cavity through the passage to the pull bar cavity;

a first spring between the actuator lever rear end and the support frame;

a second spring between the actuator piece and a top surface of the pull bar cavity;

wherein when the sheet is substantially rolled onto the core tube, the pull bar cap retracts into the pull bar cavity and pushes against the actuator piece, thereby rotating the support frame and the actuator lever via their coupling through the first spring so the actuator lever front end presses down on the upper limit switch.

10. The device of claim 9, further comprising:

a core tube rotor inserted into one end of the core tube, the core tube rotor defining an assembly cavity, the core tube rotor comprising:

a spring-loaded rocker bar pivotally mounted in the assembly cavity so inner and outer actuator heads on a distal end of the rocker bar are biased to pivot and protrude outward through inner and outer openings in the core tube;

a lower limit switch seated in the control cavity of the positioning base and below the outer actuator head of the rocker bar;

wherein:

the sheet presses against the inner actuator head to prevent the inner and the outer actuator heads from protruding through the inner and the outer openings and the outer actuator head from pressing the lower limit switch when the sheet is at least substantially rolled up on the core tube; and the sheet releases the inner actuator head to allow the inner and the outer actuator heads to protrude through the inner and the outer openings and the outer actuator head to press the lower limit switch when the sheet is at least substantially unrolled from the core tube.

11. The device of claim 10, further comprising:

an electric motor in an electric motor housing, wherein the core tube rotor is fixed to a shaft of the electric motor to roll and unroll the sheet from the core tube.

12. The device of claim 11, wherein the position base is mounted to the motor housing.

13. The device of claim 10, wherein the core tube rotor further comprises a limit block extending from the assembly cavity, wherein the rocker bar defines a limit block hole through which the limit block protrudes to limit how far the rocker bar can pivot outward.

14. The device of claim 9, wherein the sheet is selected from the group consisting of a screen and a window blind.

* * * * *